March 21, 1950     E. SCHULTHESS     2,501,619
HOSE COUPLING
Filed April 26, 1947     2 Sheets-Sheet 2
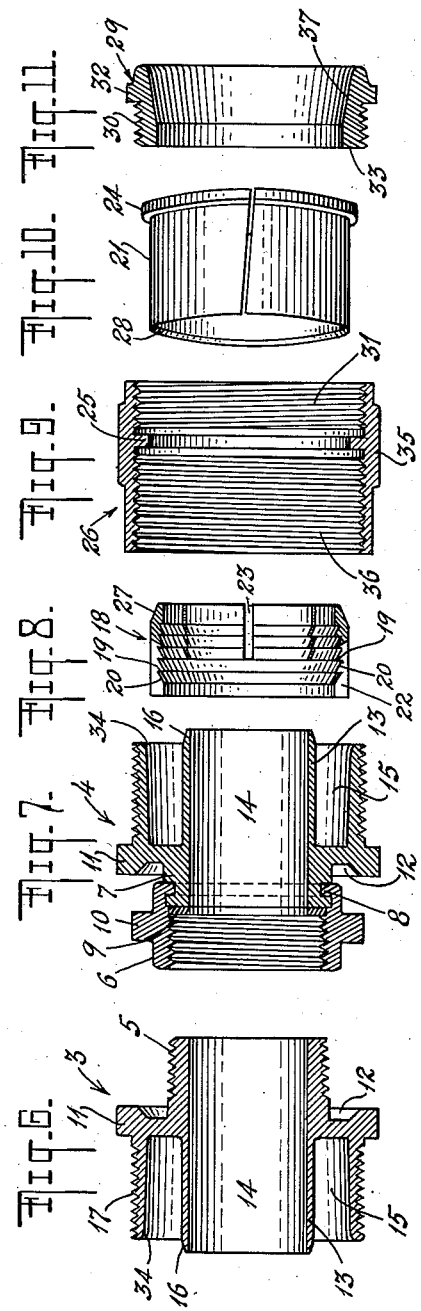
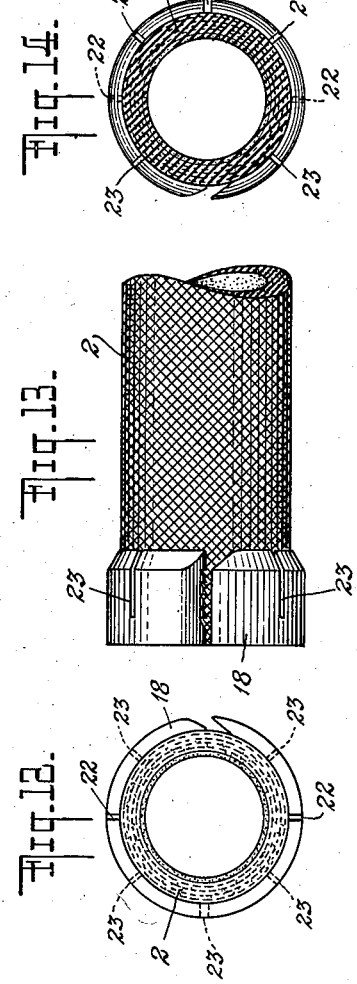
WITNESS
G. V. Rasmussen
INVENTOR.
ERNEST SCHULTHESS
BY
Klein, Alexander & Pohl
ATTORNEYS Patented Mar. 21, 1950

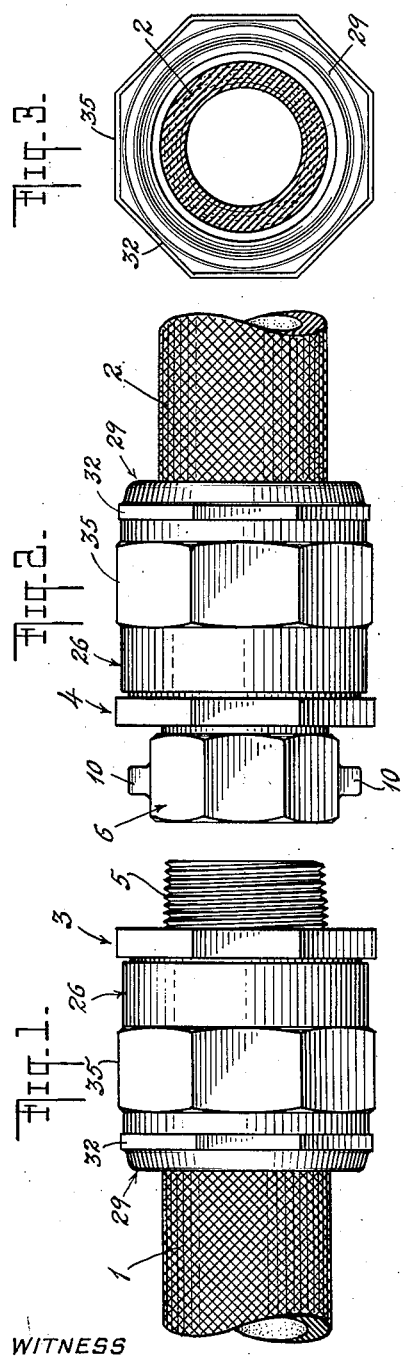

2,501,619

UNITED STATES PATENT OFFICE 2,501,619

HOSE COUPLING

Ernest Schulthess, South Orange, N. J.

Application April 26, 1947, Serial No. 744,101

4 Claims. (Cl. 285—86)

This invention relates to hose couplings and has for its principal objects the provision of an improved hose coupling which is simple and durable in construction, which can be readily assembled on the ends of lengths of any type of hose, such as, hose made of rubber, flexible metal, fabric, etc., to provide a safe, positive, leak-proof connection therebetween and without danger to the material of which such hose is constituted, which will not loosen its grip on, or cause rupture of the hose while in use and which will successfully withstand rough usage without failure or distortion of its parts.

In my Patent No. 2,044,335, dated June 16, 1936, I have disclosed a form of coupling device which has been found to be highly desirable and effective for the purposes for which it was designed. The hose coupling of the present invention represents an improvement over such prior device in that it possesses special advantages for coupling lengths of hose together, and it provides an improved grip on the hose which not only enables the coupling to be more securely and more lastingly connected to the hose, but at the same time reduces to a minimum the possibility of rupture of the hose wall, thereby prolonging the life of the hose. Furthermore, the present coupling is better adapted to successfully withstand the rough usage to which couplings are ordinarily subjected. Other advantages as well as the novel details of construction of the hose coupling of this invention will become apparent after a consideration of the description hereinbelow set forth.

My improved hose coupling is illustrated in the accompanying drawings in which similar reference characters identify similar parts in the several views and in which Figs. 1 and 2 show the male and female halves, respectively, of the coupling mounted on opposed ends of lengths of hose to be connected and in position for coupling such lengths of hose; Fig. 3 is a right-hand end view of the coupling part shown in Fig. 2; Fig. 4 is a central vertical cross-section of the parts shown in Figs. 1 and 2 in coupled relation; Fig. 5 is a sectional view taken along the line 5—5 of Fig. 4; Fig. 6 is a vertical cross-section of the male member of the male coupling half shown in Fig. 1; Figs. 7 to 11 inclusive, constitute an unassembled view of the various parts of the coupling half shown in Fig. 2 and in which Fig. 7 is a control vertical cross-section of the male member in such coupling half; Fig. 8 is a vertical cross-section of the sleeve or ring which is mounted on the end of the hose; Fig. 9 is a vertical cross-section of the main body portion of the female member of such coupling half; Fig. 10 is a perspective view of the wedging sleeve or ring which is supported in the female member and Fig. 11 is a central vertical cross-section of the tail part or outer end portion of the female member of such coupling half; Fig. 12 is a left-hand end view of the ring illustrated in Fig. 8 and shown mounted on the end of a length of hose; Fig. 13 is a side view of the parts shown in Fig. 12 and Fig. 14 is a right-hand end view of the parts shown in Figs. 12 and 13..

Referring more particularly to Figs. 1 to 3 of the drawings in which the numerals 1 and 2 designate the ends of the two lengths of hose to be connected together by the coupling and the reference characters 3 and 4 generally designate the male and female coupling halves, respectively, mounted on such hose ends. The members 3 and 4 are integral pieces of brass or of any other suitable materials and are similarly constructed, except in the respects which shall be pointed out particularly. Each of the male and female members 3 and 4 comprise a cylindrical end portion, which portions are in opposed relation when the two halves of the coupling are connected together. The end portion 5 of male member 3 is provided with an external seven thread which is adapted to interengage with an internal seven thread provided on the coupling nut 6. The end portion 7 of female member 4 is provided with an annular recess in which is loosely seated the internal end flange 8 of the coupling nut 6, whereby the nut 6 is securely but readily rotatably mounted on the female member 4. It will be apparent that the male and female members 3 and 4 are coupled together by the loosely mounted swivel nut 6 on end portion 7 being secured on to the external thread of end portion 5, a fluid tight connection between such end portions being assured by positioning a packing ring 9 therebetween. This coupling action is accomplished by means of a suitable tool engaging with lugs 10, 10 formed on the nut 6. It will be noted that the lugs 10, 10 project outwardly from the exterior surface of the nut 6 to points which are spaced from the common central axis of members 3 and 4 in their coupled condition, a distance less than the distance from such axis of any portion of the outer surfaces of the outwardly extending shoulders 11, 11 on such male and female members 3 and 4 from which project the end portions 5 and 7, respectively, of such members. Thus, the coupling nut 6 and its lugs 10 which are positioned intermediate the shoulders 11, 11 in the assembled condition of the coupling, are protected by such shoulders when the hose is dragged over the ground or through buildings and against any possibility of distortion by direct impact as when the hose is dropped while in use, such shoulders also eliminating the possibility of the lugs 10 catching on anything while the hose is in use.

The shoulders 11 of male and female members 3 and 4 are integrally formed with the inner ends of the end portions 5 and 7 and have an octangularly shaped outer edge so that a wrench may be applied to either shoulder to facilitate the tightening or loosening of the coupling nut 6. It will be noted that the opposed faces of such shoulders are so recessed at 12 that their weight is reduced to a minimum without substantial sacrifice of strength. The recesses 12 also enable the placement of informative matter on such faces where it will be protected during the usage of the coupling and greatly enhance the appearance of the coupling. In this latter connection, the inner end of the thread on the end member 5 and the groove on the end member 7 are preferably positioned outwardly from the opposed faces of the shoulders 11 so that the ends of the coupling nut 6 will not interfere with ready inspection of the recessed portions of such faces. A cylindrical portion or shank 13 is integrally associated with the shoulder 11 of each member and the inner end of the end portion thereof and together with the latter forms a passageway 14 extending longitudinally through the center of the member. The passageway 14 of each member has a diameter similar to that of the passageway 14 of the other member and substantially the same as the inside diameters of the hose lengths which are connected by the coupling (note Fig. 4), so that the flow of fluid through the male and female members 3 and 4 of the coupling is substantially unaffected. It will be understood from an observation of Fig. 4 of the drawings, that the shanks 13, 13 of the male and female members 3 and 4 are inserted into the two ends of the hose lengths which are to be coupled. In order to facilitate the insertion of a shank 13 into the end of the hose and to eliminate the possibility of the outer end of the shank rupturing the wall of the hose as the shank is so inserted, such outer end, at 16, is beveled and the bevel 16 continues smoothly into the outer wall of each shank 13 which is also smooth. Due to the uniform diameter and thickness of each shank 13, the surrounding portion of the hose will retain its uniform thickness, thus establishing a strong unstrained anchorage of the hose end on the member. Furthermore, as the bevels 16 will enable the outer ends of the shanks to form a substantially smooth unbroken continuation of the inner wall of the hose, no obstructions to the flow of the fluid from the hose into the passage of the coupling, or vice versa, will be found.

An annular recess 15 circumscribing the shank 13 of each member is formed between such shank and an annular externally threaded wall 17 integrally attached at its inner end to the outer end portion of the associated shoulder 11, such wall 17 being disposed in parallel relation with the cylindrical wall of the shank 13 so as to be concentric therewith. The distance between the outer periphery of the shank 13 and the inner periphery of the annular wall 17 in each member is such as to permit the ready insertion into the recess 15 therebetween of an end of the hose and an expansible and contractible sleeve or ring 18 mounted in position on such end of the hose, as shown more clearly in Fig. 4 of the drawings. The annular wall 17 is shorter in length than the shank 13 in each member, as is clearly shown in Figs. 6 and 7, for a purpose which will be hereinafter explained.

The ring 18 which is a split ring in order that its diameter may be varied, is made of steel or any other suitable material and is preferably shorter in width than the depth of the recess 15 so that when the parts of the coupling are assembled, it is contained entirely within the recess, as shown in Fig. 4. The size of ring 18 is preferably such that it will completely encircle the outer periphery of the hose when in position thereon yet may be compressed or reduced in diameter on the hose without any of its parts overlapping. The interior surface of the ring 18 is provided with a plurality of annularly shaped serrations or notches whose sides 19 are preferably made at an angle of substantially ninety degrees with the central axis of the ring and whose longer sides 20 are disposed at an acute angle with respect to such axis. Thus, the notches do not interfere in any way with the ready insertion of the ring 18 on to an end of the hose, but when the end of the hose is inserted into the recess 15 and a second split ring 21 is slidably forced into position in such recess (note Fig. 4), the notches will bite into the material forming the exterior surface of such hose and prevent any shifting movement of the hose ends off the shank 13 of the coupling. Each ring 18 is also provided with a plurality of equally spaced slots 22 extending inwardly from one end of the ring and a plurality of equally spaced slots 23 extending inwardly from the other end of the ring, the slots 22 and 23 being in staggered relation as can be seen more clearly in Fig. 12 of the drawings. The purpose of the slots 22 and 23 is to increase the flexibleness of the split ring 18 and at the same time to provide additional anchorage for such rings on the material of the hose ends, as the material of the hose will be forced into such slots when the rings 21 are forced into position over the rings 18 in each half of the coupling. Thus, the split rings 18, which may be termed anchor rings, by reason of the notches on their interior faces and the slots 22 and 23 obtain a firm and relatively permanent anchorage on the ends of the hose when compressed under the forces of the sliding rings 21 and will effectively prevent any possibility of the ends of the hose from shifting off the shanks 13, once the parts have been properly assembled. The grips of the rings 18 on the ends of the hose will be uniform throughout their circumferences and the resulting uniform compression exerted on such hose ends by such rings, together with the fact that the gripping action of such rings is exerted on the exterior tougher walls of the hose will minimize the possibilities of rupture or weakening of the hose wall in usage.

The second split ring 21 associated with each split ring 18 is a sliding ring or sleeve which in the assembled condition of the parts encircles the ring 18 and is positioned in between the latter and the outer annular wall 17 of the recess 15, in wedged relation, as shown in Fig. 4. The rings 18 are beveled at 27 and the rings 21 are beveled at 28 to facilitate the insertion of each sliding ring 21 over its associated ring 18 and to eliminate the possibility of the inserted end of ring 21 engaging with the inner ends of the slots 23 of ring 18 during the assembly of the parts. The rings 21 which are made of the same material as the rings 18, are appreciably greater in width than the lengths of the walls 17 so that in the assembled condition of the coupling, each ring 21 extends beyond the outer end of its associated wall. The outer end of each ring 21 is provided with an outwardly extending shoulder or flange 24 which seats against the outer face of an internal flange 25 provided in the female member 26 of each coupling half. The ring 21 is also split or slotted diagonally across its entire width and through the shoulder 24 to enable it to seat snugly and uniformly between the ring 18 and the wall 17 of each member without the necessity of exactly machining ring 21 to accomplish such results. The recess 15 and the rings 18 and 21 are so dimensioned with respect to the hose that is to be connected, that the end portion of the hose and the rings 18 and 21 are tightly wedged together in the recess, the ring 21 encircling and tightly compressing the ring 18 around the outer periphery of the hose and into anchored relation therewith and jamming the inner periphery of the hose with a uniform compression tightly against the outer periphery of the shank 13. The shank 13 in each coupling half is preferably made of sufficient length to extend appreciably beyond the outer end of the ring 18 when the parts are assembled in position in the recess 15, as shown in Fig. 4, to afford a better grip on the hose and at the same time to maintain at a minimum the stresses produced on that portion of the hose wall adjacent to the outer end of the ring 18, by causing any flexing or bending strains on the hose wall to be absorbed by that portion of the hose wall adjacent the outer end of the shank 13, thus preventing the possibility of rupture of the hose wall adjacent the outer end of the ring 18 and thereby substantially prolonging the life of the hose.

Threadedly engaging the outer wall 17 of the recess 15 in each coupling half, is an internally threaded female member made of brass or any other suitable metal and comprising an annular body portion or union 26 and a tail or end portion 29. The inner end portion of the tail part 29 is provided with a male left-handed thread 30 which screws into the female left-handed thread 31 provided on the outer end portion of the union member 26. An octangularly-shaped shoulder 32 is provided on the tail part 29 so that the latter may be screwed tightly in place on the union member 26 by means of a wrench. When the union member 26 and the tail part 29 are in assembled condition, as shown in Fig. 4, an annular recess or groove is formed on the inner periphery of the female member between the inner end 33 of the tail part 29 and an inwardly extending annular flange or shoulder 25 provided on the union member 26. The recess is adapted to receive the flange 24 of the slidable ring 21 which is placed in position in the union member 26 before the tail part 29 is screwed in place on the latter. Thus, with this arrangement, the ring 21 is slidably inserted into or removed from the recess 15 when the female member is screwed or unscrewed, respectively, on the outer wall 17 of the recess 15 by means of the inner end 33 of the tail part 29 and the annular shoulder 25, respectively, which abut against and force the flange 24 of the ring 21 in the direction that the female member is moving. The outer end of each wall 17 is provided with an interior bevel or flare 34 to guide the ring 21 into the recess 15 when the female member is screwed on the wall 17 and as has been explained, the outer edge of the ring 18 is provided with a bevel 27 which extends away from the flare 34 on wall 17 to guide the ring 21 into encircling position on to the ring 18 as the latter is slidably inserted into the recess 15. The bevel 28 on the inner edge of the ring 21 enables the ring to be readily inserted into wedging position between the ring 18 and the outer wall 17 of the recess 15 as it is moved inwardly under the influence of the end 33 of the tail part 29. The ring 21 is sufficiently wide so that when it is inserted in position in the recess 15 with its inner end abutting against or lying closely adjacent to the end wall of the recess, as shown in Fig. 4, the flange 24 of ring 21 is positioned beyond the outer end of the wall 17 to provide sufficient space therebetween for the annular shoulder 25 formed on the inner periphery of the union member 26. The latter member is provided with an octangularly-shaped shoulder 35 as is clearly shown in Figs. 1 and 2, so that it may be screwed or unscrewed on its associate member 3 or 4 by means of a wrench. The shoulder 35 is relatively wide and extends over the surface of the union 26 to a substantial distance on either side of the flange wall 25 thereby greatly increasing the strength of this member and preventing any possibility of the end bearing thread 31 from becoming distorted or bulging under the heavy stresses to which such member 26 may be subjected when the hose ends are being anchored to the coupling.

It will be understood from the foregoing that the male and female halves of the coupling are similar in construction except for the end portions 5 and 7 thereof and that each coupling half has associated with its member 3 or 4 an anchor ring 18, a slidable ring 21 and a female member composed of a union member 26 and a tail member 29. Before assembling the coupling on a pair of hose lengths to be connected, the parts of the female members are preferably first assembled by inserting each ring 21 into the outer end of a union member 26 so that the free end of the ring extends out toward the inner end of the female member and the flange 24 thereof abuts against the outer face of the annular shoulder 25 of such union. The shoulder 25 preferably has an inside diameter only slightly greater than the external diameter of the ring 21 so that the latter is supported in the female member substantially parallel with the threaded portion 36 of the inner end of said member, thereby holding the insertable end of the ring 21 in proper position for insertion between the ring 18 and the wall 17 of the recess 15. The tail part 29 of each female member is then screwed tightly in position on the outer end of its associated union member 26. With the female members thus assembled, each assembly is slipped over an end of one of the lengths of hose to be connected and the rings 18 are then placed in position on the end portions of the hose that are to be contained in the recesses 15 of the members 3 and 4. The thickness of the wall of the hose and the kind of material of which it is made will govern the size and thickness of the rings 18 that are to be used, so that when the coupling is assembled and connecting such hose lengths, the proper amount of compression will be exerted on the end portions of the hose to securely hold them in the coupling. The end portions of the hose lengths together with the rings 18 thereon, are then forced over the shanks 13 of the members 3 and 4 of the coupling and into the annular recesses 15 until the ends of the hose abut against the end walls of such recesses. The female members are then screwed on the outer peripheries of the walls 17 by means of a wrench. As a female member is screwed into position on the wall 17 of each coupling half the ring 21 associated therewith is carried forward by said member and guided by the beveled end 34 of the wall 17 into the recess 15. The beveled edge 28 of the ring 21 then enters the V-shaped space formed between the beveled edge 27 of the ring 18 and the inner periphery of the outer wall 17 of the recess and under the force exerted by the end 33 of the associated tail part 29 on the outer face of the flange 24, forces its way between such members, compressing the ring 18 tightly around the outer periphery of the hose and firmly anchoring it therein. The inner periphery of the hose under the compression force of the ring 18 is wedged tightly and uniformly against the smooth outer periphery of the shank 13 and a portion of the material constituting the outer layer of the hose is pressed into and firmly anchored in the serrations or notches on the interior of the ring 18 and the slots 22 and 23 of such ring. The hose end is thus tightly gripped in place in the associated member 3 or 4 between the anchoring ring 18 which exerts an even compressive pressure on the outer periphery thereof through the sliding or wedging ring 21 and the outer peripheral surface of the shank 13, and the gripped hose material is firmly anchored and will remain in position in the recess 15 while in use regardless of the force with which the fluid is forced through the hose and the amount of binding the hose will be subjected to. Due to the fact that the shank 13 extends beyond the anchoring ring 18 the hose is prevented from bending at the point where such ring ends thereby eliminating the amount of strain on the end portion of the hose while in use. The inner periphery of each tail part 29 is also tapered outwardly at 37 to give the hose a greater bending radius without tension or strain. These features of construction enable the hose to bend easily without tension or strain on the walls of the hose thus eliminating possibility of rupture of such walls while in use and increasing the life of the hose.

To disconnect a hose end from the coupling, the female member of a coupling half is unscrewed from the outer wall 17 of the recess 15 by means of a wrench, the inwardly extending shoulder 25 thereof moving outwardly into contact with the inner face of the flange 24 on the associated ring 21 and as the female member is unscrewed, forcing the flange outwardly, thereby slidably removing the ring 21 from the recess 15. When the ring 21 has been withdrawn from the recess, the ring 18 is enabled to expand and release its pressure on the outer surface of the wall of the hose and the hose end may then be withdrawn from the recess by pulling outwardly on it.

While I have shown and described a particular construction and mode of utilizing the invention for the purpose of enabling a clear understanding to be obtained of the same, I do not wish to limit myself to such, hence various changes in the form, construction and arrangement of the several parts may be resorted to without departing from the spirit and scope of the invention in order to render the invention susceptible of various uses as will be apparent to those familiar with coupling devices.

What is claimed is:

1. A hose coupling including a male half, a female half and means for securing the inner ends of said halves together in a fluid-tight connection, each of said coupling halves comprising a body section having an outwardly projecting inner tubular shank provided with a smooth outer surface tapering at its outer end toward the inner surface of such shank and adapted to enter the end portion of a hose, an outer annular portion concentrically disposed with relation to said tubular shank and forming with the latter the outer and inner walls, respectively, of an annular recess adapted to receive the end portion of the hose, an anchoring ring positioned in each recess and adapted to encircle the inserted end of a hose, said anchoring ring being split and having a plurality of spaced annularly-shaped notches and longitudinally extending slots formed therein for receiving the material of which the outer surface of the hose is constituted, a female unit associated with each coupling half and comprising a union member internally threaded at each end and provided with an inwardly extending shoulder formed on its peripheral surface intermediate the threaded ends thereof, the wall of said union member being thickened in the region of said shoulder and for a substantial distance on each side thereof; one end of said union member being adapted to threadedly engage with the outer wall of said recess, an annular end portion threadedly engaging with the other end of said union member, the inner edge of said end portion being spaced from said shoulder so as to form a groove therebetween and a split slidable ring positioned inside of said female unit and having an end flange loosely seated in said groove, said slidable ring being positioned in said recess intermediate the outer wall thereof and said anchoring ring and surrounding the latter, said slidable ring being adapted to uniformly contract said anchoring ring about the inserted end portion of a hose so that that portion of the hose encircled by said anchoring ring is uniformly and tightly pressed against the outer surface of said tubular shank.

2. A hose coupling such as defined in claim 1, in which said male half has an inner tubular end portion provided with an external thread extending in opposed relation to said shank portion thereof, and in which said female half has an inner tubular end portion provided with and external annular groove extending in opposed relation to said shank portion thereof, and in which the means for securing the inner ends of said halves together consists of a coupling nut having an inwardly extending flange at one end loosely seated in said annular groove, having an internal thread adapted to threadedly engage with the external thread on said inner end portion of said male half, and having means on its exterior surface adapted to be engaged by a tool to connect and disengage the inner end portions of said male and female halves, and said male and female halves each including an external annular shoulder positioned intermediate the shank and inner end portions thereof and extending outwardly from the central axis of the coupling a greater distance than the tool engaging means on said coupling nut.

3. A hose coupling comprising a body section composed of a tubular portion having a uniform interior diameter throughout its entire length, an external annular shoulder integrally connected to said tubular portion intermediate its length, the outer surface of said tubular portion outwardly from said shoulder being smooth and tapering at its outer end toward the interior surface of said tubular portion and being adapted to enter the end portion of a hose, the outer surface of said tubular portion on the other side of said shoulder being provided with connecting means, an annular wall integral at its inner end with said shoulder and projecting outwardly therefrom in concentric spaced relation over said tubular portion to form an annular hose end receiving recess therebetween, the interior surface of said annular wall being smooth and the exterior surface thereof being provided with an external thread, an anchoring ring positioned in said recess and adapted to encircle the inserted end of a hose, said anchoring ring being split, having a plurality of annular notches formed on its interior surface and a plurality of spaced slots extending inwardly from the ends thereof for receiving the material of which the outer surface of the hose is constituted and having a smooth outer surface which at its outer end inclines toward the inner surface thereof, a female unit associated with said body section and comprising a union member internally threaded at each end and provided with an inwardly extending shoulder formed on its inner peripheral surface intermediate the threaded ends thereof, the wall of said union member being thickened in the region of said shoulder and for a substantial distance on each side thereof, one end of said union member being adapted to threadedly engage with said annular wall, an annular end portion threadedly engaging with the other end of said union member so as to form a groove between the inner end thereof and said union shoulder, and a split slidable ring positioned inside of said female unit and having a flange loosely seated in said groove, said slidable ring being positioned in said recess intermediate the said annular wall and said anchoring ring and surrounding the latter, said slidable ring having a smooth interior surface tapering at its inner end toward the exterior surface thereof, and being adapted to uniformly contract said anchoring ring about the inserted end portion of a hose so that the latter is uniformly and tightly pressed against the outer surface of said tubular portion.

4. A coupling such as defined in claim 3, in which the shoulder on said body section is provided on its inner face with an annular recess adapted to receive informative matter and in which the notches on said anchoring ring each have one side disposed at approximately ninety degrees with the central axis of the ring and a longer side disposed at an acute angle with respect to such axis, and in which the slots extending inwardly from one end of said anchoring ring are disposed in staggered relation with respect to the slots extending inwardly from the side thereof.

ERNEST SCHULTHESS.

REFERENCES CITED

The following references are of record in the file of this patent:

UNITED STATES PATENTS

| Number | Name | Date |
|---|---|---|
| 2,313,323 | Cowles | Mar. 9, 1943 |
| 2,328,298 | Santhoff | Aug. 31, 1943 |

Certificate of Correction

Patent No. 2,501,619 — March 21, 1950

ERNEST SCHULTHESS

It is hereby certified that error appears in the printed specification of the above numbered patent requiring correction as follows:

Column 8, line 22, after the words "on its" insert *inner*;

and that the said Letters Patent should be read with this correction therein that the same may conform to the record of the case in the Patent Office.

Signed and sealed this 4th day of July, A. D. 1950.

[SEAL]

THOMAS F. MURPHY,
*Assistant Commissioner of Patents.*